United States Patent
Eriksson et al.

(10) Patent No.: US 9,374,133 B2
(45) Date of Patent: Jun. 21, 2016

(54) METHOD FOR SAVING POWER IN A TELECOMMUNICATIONS SYSTEM

(75) Inventors: Per-Erik Eriksson, Stockholm (SE); Chenguang Lu, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 106 days.

(21) Appl. No.: 14/234,757

(22) PCT Filed: Jul. 25, 2011

(86) PCT No.: PCT/SE2011/050967
§ 371 (c)(1),
(2), (4) Date: Jan. 24, 2014

(87) PCT Pub. No.: WO2013/015728
PCT Pub. Date: Jan. 31, 2013

(65) Prior Publication Data
US 2014/0169489 A1    Jun. 19, 2014

(51) Int. Cl.
  H04L 27/26    (2006.01)
  H04W 52/02   (2009.01)
  H04B 3/32    (2006.01)

(52) U.S. Cl.
  CPC ............ *H04B 3/32* (2013.01); *H04L 27/2601* (2013.01); *H04L 27/2618* (2013.01); *H04W 52/02* (2013.01)

(58) Field of Classification Search
None
See application file for complete search history.

(56) References Cited

U.S. PATENT DOCUMENTS

| 6,144,695 | A  | * | 11/2000 | Helms | H04L 5/14 370/201 |
| 6,370,187 | B1 | * | 4/2002  | Agah  | H04L 27/0002 375/219 |
| 6,735,244 | B1 | * | 5/2004  | Hasegawa | H04L 25/03038 375/219 |
| 8,411,696 | B1 | * | 4/2013  | Ko    | H04L 12/2861 370/386 |
| 8,605,567 | B2 | * | 12/2013 | Wilkes | H04L 12/2892 370/201 |
| 2002/0136284 | A1 | * | 9/2002  | Davis  | H04L 25/028 375/222 |
| 2004/0160906 | A1 |   | 8/2004  | Greszczuk et al. | |
| 2006/0268733 | A1 | * | 11/2006 | Rhee  | H04L 41/082 370/252 |

(Continued)

FOREIGN PATENT DOCUMENTS

| EP | 2391031 A1 | 11/2011 |
| WO | 2011053207 A1 | 5/2011 |

OTHER PUBLICATIONS

Upzide Labs, "G.vdsl2: Pilot sequence assisted vector channel estimation", International Telecommunication Union, Telecommunication Standardization Sector, Study Period 2005-02008, Study Group 15, Contribution 177, Oct. 1, 2006, pp. 1-6, XP-002505924.

(Continued)

*Primary Examiner* — Candal Elpenord
(74) *Attorney, Agent, or Firm* — Coats & Bennett, PLLC (57) ABSTRACT

In a vectoring-capable DSL system, power can be saved by a low power mode wherein data transmission is reduced or halted, but synch symbols continue to be transmitted, so that estimation of crosstalk coefficients may continue during the low power mode. When crosstalk coefficient estimates are up to date, a line may exit low power mode without causing problematic changes of crosstalk noise in other lines, since the vectoring functionality will eliminate or reduce the crosstalk.

16 Claims, 8 Drawing Sheets

(56) References Cited

U.S. PATENT DOCUMENTS

| | | | |
|---|---|---|---|
| 2009/0285271 A1* | 11/2009 | Perez De Aranda Alonso | H04L 25/03133 375/219 |
| 2009/0310502 A1* | 12/2009 | Nuzman | H04B 3/32 370/252 |
| 2010/0177855 A1* | 7/2010 | Ashikhmin | H04B 3/487 374/346 |
| 2010/0232486 A1 | 9/2010 | Starr et al. | |
| 2010/0254380 A1 | 10/2010 | Clausen et al. | |
| 2011/0007623 A1* | 1/2011 | Cendrillon | H04B 3/32 370/201 |
| 2012/0051410 A1* | 3/2012 | Flowers | H04B 3/32 375/222 |

OTHER PUBLICATIONS

Oksman, V., et al., "The ITU-T's New G.vector Standard Proliferates 100 Mb/s DSL", IEEE Communications Magazine, Oct. 1, 2010, pp. 140-148, vol. 48, issue 10, IEEE Press, Piscataway, NJ, USA.

* cited by examiner

METHOD FOR SAVING POWER IN A TELECOMMUNICATIONS SYSTEM

TECHNICAL FIELD

The invention relates in general to the field of telecommunications and in particular to the field of digital subscriber line technology.

BACKGROUND

In ITU-T recommendation G.993.2 (VDSL2) there is no low power mode defined. This means that independent of whether there is traffic or not the VDSL2 modems run at full power. Power is wasted because it is used to transmit idle data. A modem will run at full power even if the user is not using the modem. This way of operation is not power efficient and implies that the operators as well as the CPE (Customer Premises Equipment) user will have to waste a lot of power just transmitting and receiving idle data.

For the previous DSL (Digital Subscriber Line) standard ADSL2/ADSL2+, a low power mode was defined. However, a problem with such a low power mode is that when a line exits low power mode, crosstalk from that line into neighboring lines increases suddenly, and hence these lines experience a sudden noise level increase which may cause service disruption. In systems such as VDSL2 which use higher frequencies, that problem gets even worse because of the increased crosstalk at high frequencies.

Further, low power mode was implemented as a reduction of the transceiver transmit power. In systems such as VDSL2, the transceiver transmit power is only a small part of the total power and so the power savings of the previous low power concept will be rather small.

For these reasons, a low power mode for VDSL2 has not been defined. A problem with VDSL2 is thus that when the line is idle, power is wasted.

SUMMARY

The object of saving power may be solved by a method in a DSL access equipment, where the equipment has a normal mode for data transmission and a low power mode for saving power, and the equipment is adapted for performing vectoring crosstalk cancellation between all the lines in at least a group of lines, by the following steps:

On a first line which is in low power mode; not transmitting or transmitting with reduced power with respect to the normal mode in some or all of the time slots which in the normal mode are allocated for transmission of payload data.

Transmitting first synch symbols on the first line in some or all time slots which in the normal mode are allocated for transmitting synch symbols.

Modulating the first synch symbols transmitted in said time slots so as to form a pilot sequence.

Transmitting second synch symbols to the other lines in the group in the same time slots as the first synch symbols are transmitted.

Modulating said second synch symbols so as to form a pilot sequence for each line
wherein all the said pilot sequences sent to the first line and to each of the other lines are orthogonal to each other The object of saving power may also be achieved by a DSLAM (DSL Access Multiplexer) which comprises a vectoring unit and a low power mode control unit for shutting down transmission during selected superframes or during selected time slots within a superframe, where the vectoring unit is arranged to transmit orthogonal pilot sequences in such synch time slots during which transmission is not shut down by the low power mode control unit.

The object of saving power may also be achieved by a vectoring-capable DSL CPE (Customer Premises Equipment) comprising a low power mode control unit for shutting down transmission during selected superframes or during selected time slots within superframes, and further comprising a unit for supplying a pilot sequence for transmission in such synch time slots during which transmission is not shut down by the low power mode control unit.

The object of saving power may also be achieved by a low power mode in a DSL access equipment, where the equipment also has a normal mode for data transmission, and is adapted for performing vectoring crosstalk cancellation between all the lines in at least a group of lines and where the low power mode comprises not transmitting or transmitting with reduced power with respect to the normal mode in some or all of the time slots which in the normal mode are allocated for transmission of payload data, on a first line which is in low power mode, and also transmitting on the first line first synch symbols in some or all time slots which in the normal mode are allocated for transmitting synch symbols, the first synch symbols being modulated so as to form a pilot sequence and transmitting second synch symbols to the other lines in the group in the same time slots as the first synch symbols are transmitted, said second symbols being modulated so as to form a pilot sequence for each of said other lines wherein all the said pilot sequences sent to the first line and to each of the other lines are orthogonal to each other.

Said object may further be achieved by a method of operating a DSLAM which performs vectoring crosstalk cancellation and is arranged to support lines operating in a normal mode and has normal synch time slots allocated for sending of synch symbols to lines in normal mode wherein the DSLAM is also arranged to support lines operating in a low power mode and wherein a subset of the normal synch time slots are also low power synch time slots allocated for sending of synch symbols to the lines in low power mode. The DSLAM transmits first orthogonal pilot sequences to the lines in normal mode in those normal synch time slots which are not low power synch time slots and transmits second orthogonal pilot sequences to the lines in either low power or normal mode in the low power synch time slots.

Said DSLAM may preferably be further improved by the following options:

The DSLAM may advantageously transmit synch symbols to the lines in low power mode in the low power synch time slots only.

Further, the DSLAM may use error samples recorded as a result of the transmission of the first pilot sequences to estimate crosstalk coefficients between the lines in normal mode.

Still further, the DSLAM may use the error samples recorded as a result of the transmission of the second pilot sequences to estimate crosstalk coefficients between all the lines in either normal or low power mode.

It is an advantage of the invention that power may be saved. A further advantage is that low power mode may be terminated or entered without causing disturbance to other lines. Yet an advantage is that low power mode may be terminated or entered quickly

DETAILED DESCRIPTION

The problem of wasted power in VDSL2 and similar systems may be addressed by a novel low power mode which combines a complete shutdown of certain parts of the transmission equipment at specific times combined with the application of a modified version of G.993.5 (G.vector) vectoring techniques.

Vectoring is a technique for FEXT (Far End CrossTalk) cancellation where the transmission and/or reception on the VDSL2 lines is jointly processed. In the downstream direction pre-coding is used which predistorts the transmitted signals in such a way so that the crosstalk into other lines annihilates as the signal propagates along the cable. In the upstream direction the received signals are post-processed to cancel the FEXT.

In this way, higher data rates can be achieved because crosstalk noise is removed.

The ITU-T recommendation, G.993.5 (G.vector), specifying vectoring for VDSL2 (ITU-T G.993.2) is the latest DSL standard. The VDSL2 FEXT crosstalk is the static noise that most severely limits the performance of VDSL2 systems.

The present inventors have found that vectoring techniques may advantageously be used to cancel or reduce the sudden change in crosstalk to neighboring lines when a line comes out of a low power mode, provided that measures are also taken to keep the estimates of crosstalk coefficients updated also when a line is in low power mode.

Crosstalk coefficients may change over time, e.g. because of temperature changes, and if the crosstalk coefficients are not correctly estimated for a line coming out of low power mode, then crosstalk from and to that line will not be cancelled correctly, potentially leading to service disruption on neighboring lines as well as on the line itself.

By using the property that vector VDSL2 modems will be synchronized and transmission is coordinated it will be possible in a controlled way to turn modems on and off or decrease respectively increase the transmit signal without causing transient crosstalk into neighbor modems. In order to maintain synchronization and track changes in line properties or crosstalk it is desirable to continue to transmit the synch symbols with some (possibly programmable) periodicity. In this way the CPE and DSLAM can make the necessary measurement and estimations to track line changes.

Hence, a useful low power mode may be introduced.

Variants of low power modes are possible, for example a mode with low bit rate traffic or a mode where all data transmission is ceased.

Synch symbols are preferably transmitted at normal or near-normal power levels in order to enable an accurate estimation of crosstalk coefficients.

All modems in a VDSL2 vectored group can cancel the self FEXT generated from every member in the group by estimating the crosstalk coupling between the copper pairs. This means that one modem could reduce or increase the power and the other modems will still be able to cancel the crosstalk. Based on this, it is obvious that if one line reduces its power during a period and then suddenly returns to full power this would not cause any transient crosstalk into the other lines in the vectored group because the equipment will cancel the crosstalk independent of the transmitted signal level.

In order to estimate the coefficients of crosstalk between each line pair combination, transmission is modulated such that the signs of certain tones of the synch symbols sent to the lines of the vectoring group are varied according to pilot sequences. These sequences are selected such that they are orthogonal to each other (meaning that the scalar product of any two sequences is zero). The equipment receiving the synch symbol (DSLAM or CPE) registers an error sample which is made up of crosstalk contributions from the other lines in the group. When the pilot sequences are orthogonal, the crosstalk contribution from a first line to second line can be found by scalar multiplying the vector made up from the sequence of error samples from the second line with the vector made up of the pilot sequence sent to the first line.

Hence, in order to estimate the crosstalk coefficients between all line pairs in the vectoring group also when one or more of them are in low power mode, sending of synch symbols to the lines in low power mode needs to continue in some way, and the pilot sequence of synch symbols sent to a line in low power mode needs to be orthogonal to the sequences sent to the other lines of the vectoring group at the same time.

This can be achieved in several ways.

Figure 1:
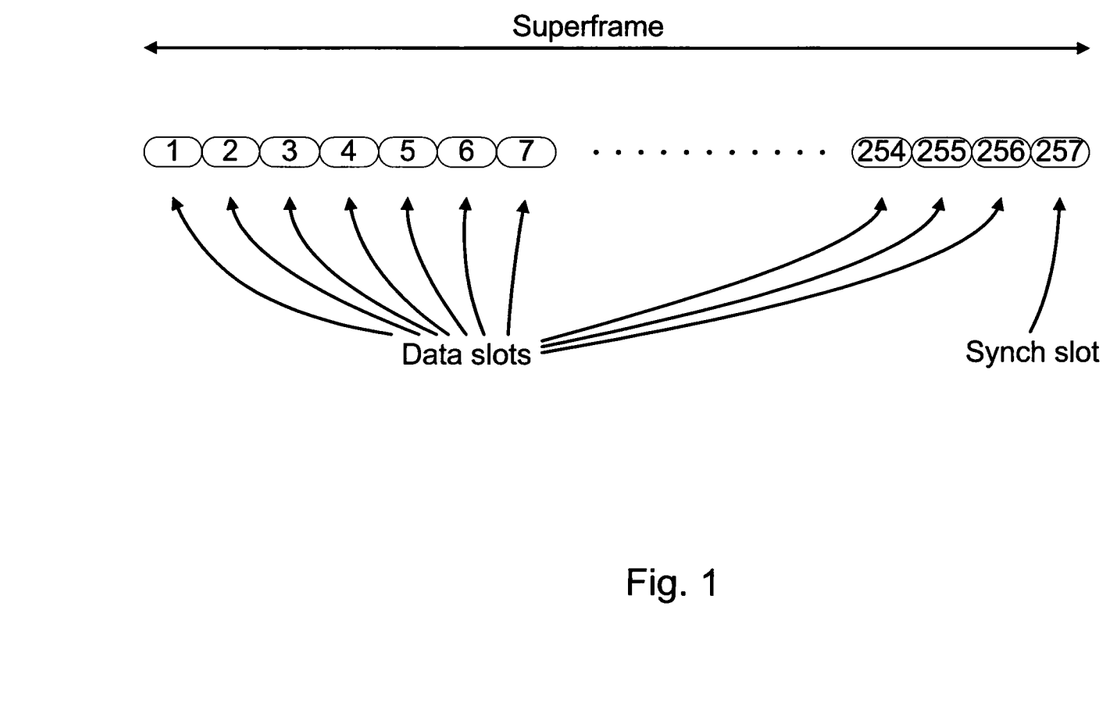
FIG. 1 shows a diagram of the time structure of a normal VDSL2 superframe.

A simple first variant is to use a low power mode which changes the use of the DSL superframe. With reference to FIG. 1, a superframe in VDSL2 is made up of 257 DMT (Discrete MultiTone) symbols. Each DMT symbol is transmitted in a time slot of 250 us. The transmission of the symbol consists of QAM (Quadrature Amplitude Modulation)-modulated DSL tones. 256 slots in the superframe are for transmission of symbols carrying data (including overhead signaling), while one slot is for transmission of a synch symbol. In order to form the pilot sequence, a particular set of tones of the synch symbol are modulated as either +1 or −1.

Figure 2:
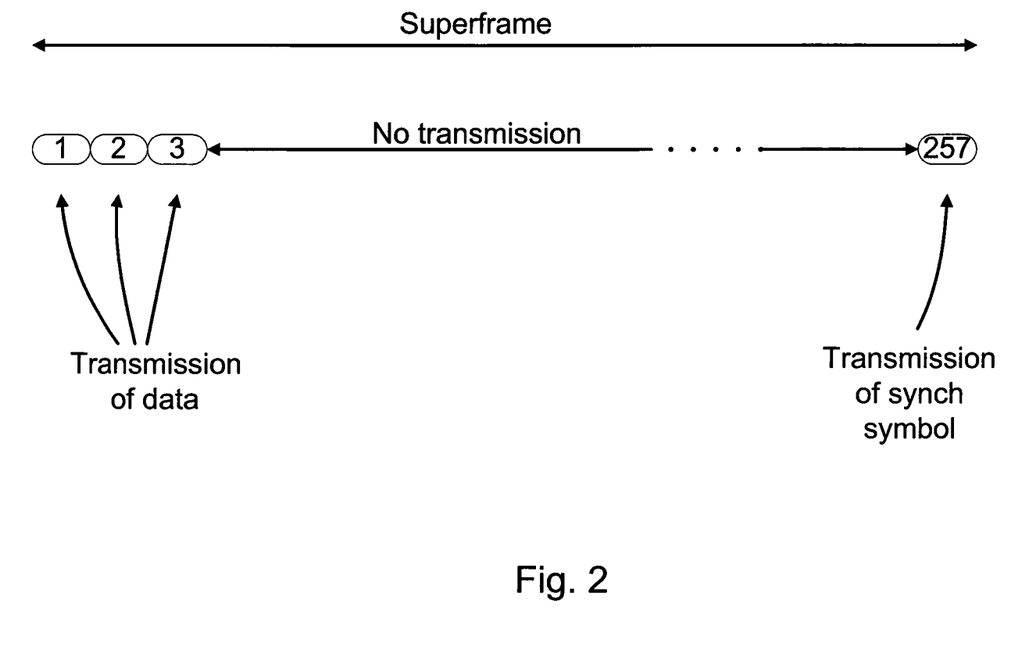
FIG. 2 shows a diagram of the time structure of a VDSL2 superframe modified for a low power mode.

With reference to FIG. 2, the low power mode may be implemented by not transmitting on some or all of the DMT symbols carrying data, while continuing the transmission of synch symbols. For example, one or a few data symbols may be transmitted in addition to the synch symbol to allow transmission of commands to enter and exit low power mode (e.g. over the overhead channel), and to allow reporting of error samples over the backchannel from the CPE to the DSLAM, while during the remaining time slots no transmission takes place. During this non-transmission time, preferably the DSP (Digital Signal Processor) and the AFE (Analog Front End) are shut down.

A low bit rate line may have to transmit during more slots than a high bit rate line, since the low bit rate line will carry fewer bits per DMT symbol. For a line operating at 20 Mbit/sec, it will be necessary to transmit approximately 14 DMT symbols in order to transfer the error samples from a previous synch symbol.

In this way, a line may go into low power mode while the estimation of crosstalk coefficients continues to function substantially as if there had not been any low power mode. When the line exits low power mode, crosstalk can immediately be cancelled, and there will not be any problem with sudden crosstalk variations in neighboring lines. Because of the simplicity, such a variant is particularly easy to implement and does not require changes to the concurrent handling of crosstalk coefficient estimation for other lines.

Figure 3:
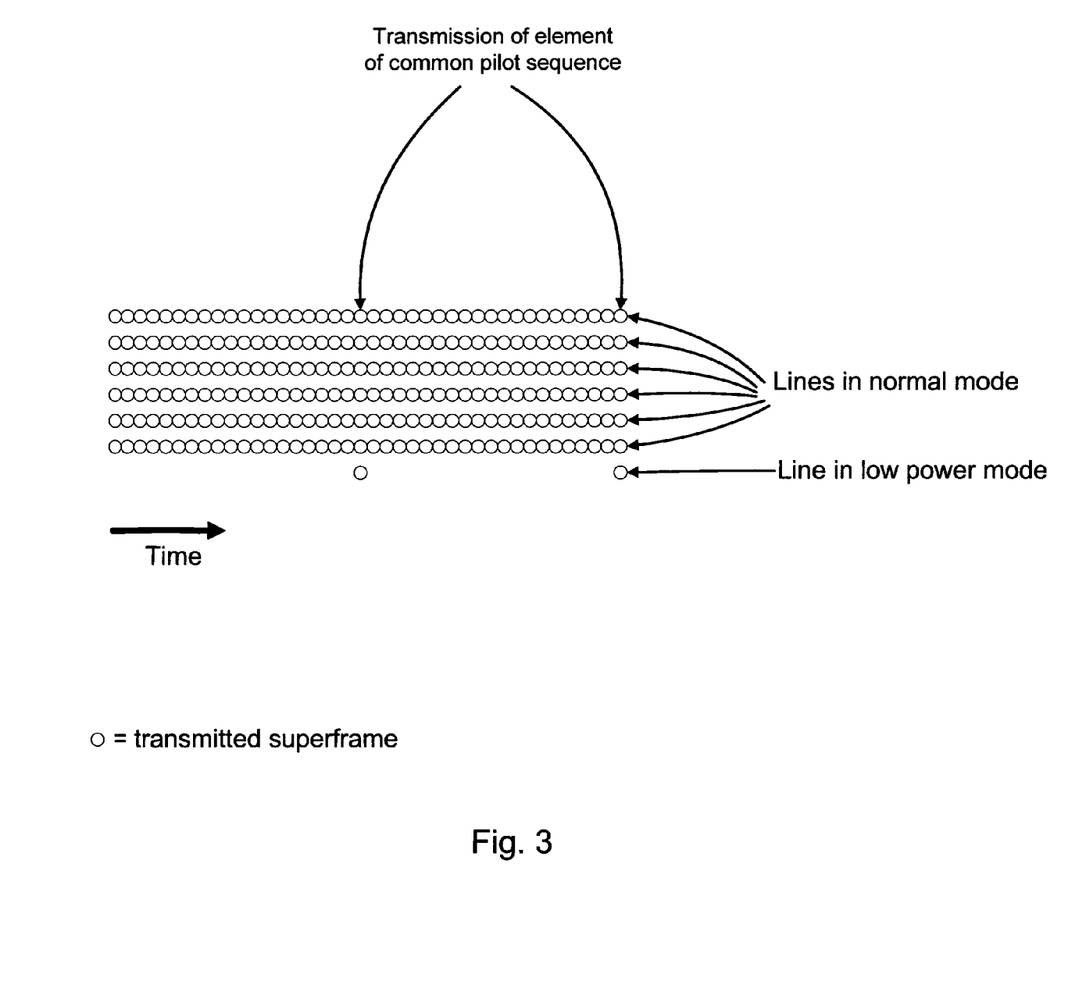
FIG. 3 shows diagram of the time structure of transmission of superframes to a group of lines, where one of the lines is in a low power mode.

In a second variant, instead of changing the structure of the superframe, transmission may cease during entire superframes. E.g. every 20th superframe could be transmitted, and transmission halted therebetween. This is shown in FIG. 3. This would allow parts of the transmission equipment to be shut down for longer periods than in the first variant, which saves more power and which would be particularly beneficial if shutting down and/or starting up of those parts is slow.

For VDSL2, the modems should thus preferably switch off the line driver and other functionalities e.g. the DSP and AFE during intervals that are a multiple (20) of the VDSL2 synch symbol period, i.e. n×257 where n is an integer. The synch symbol will be transmitted at a multiple of the original synch symbol period. With this mechanism the active lines can update the crosstalk-coupling when the synch symbol of the line in low power mode is transmitted.

Estimation of crosstalk coefficients would take place using the normal methods; however, it would be slower, since it would be based on sending the elements of the pilot sequences 20 times slower, also to the lines which are not in low power mode. The elements of the pilot sequences would be transmitted in the synch slots of the superframes in FIG. 3 which are pointed to by the arrows labeled "Transmission of element of common pilot sequence".

In the other synch slots, where no signal is transmitted to the lines in low power mode, transmission of other pilot sequences may still be made to other lines, but this cannot be used for estimation of crosstalk coefficients between the line in low power mode and any other line. Only coefficients between the lines which are operating normally may be so estimated.

Hence the crosstalk coefficients between all lines may be estimated by use of pilot sequences whose elements are transmitted every $20^{th}$ superframe, whereas the synch slots in the other superframes may be used to transmit elements of pilot sequences for estimating crosstalk coefficients between the lines in normal mode. The crosstalk coefficients between the lines in normal mode would be updated at near normal speed ($^{19}/_{20}{}^{th}$), whereas the coefficients between the line in low power mode and the other lines would be updated 20 times slower than normal speed. This may be a good compromise if a somewhat lower accuracy or speed in the crosstalk coefficient estimation is acceptable for lines in low power mode.

Thus, there will in essence be two sets of pilot sequences transmitted, the sequences within a set being orthogonal to each other. One set is transmitted in the synch slots of every $20^{th}$ superframe (these may be called the low power synch time slots), whereas the other set is transmitted in the remaining synch slots (i.e. those normal synch time slots which are not low power synch time slots). The error samples resulting from the transmission of the pilot sequences in the low power mode synch slots are used to estimate crosstalk coefficients between all the lines, whether in normal or low power mode, whereas the error samples resulting from the transmission of pilot sequences in the remaining synch time slots are used to estimate crosstalk coefficients between the lines in normal mode.

If a need for faster updating of the coefficients for the line in low power mode arises, the line could temporarily change to the first variant (FIG. 2). This could be for example if another line joins the vectoring group. A command from the DSLAM to the CPE to make such a change could be sent on the EOC (Embedded Operations Channel) channel or by way of a modified synch symbol. This would provide high accuracy/speed when needed while still providing large power savings at other times.

The number 20 in the example is arbitrarily chosen, a practical choice need to be large enough as to save substantial amounts of power, while small enough that crosstalk coefficients for the line in low power mode do not change greatly from one update to the next.

The number could be set by operator preference, or could be dynamically changed by the DSLAM to adapt to the variability of crosstalk coefficients. If the number is large, the time between update of crosstalk coefficients involving lines in low power mode will take more time. If crosstalk coefficients vary with time, this may lead to error in the estimation, and the greater the variability of the crosstalk coefficients, the larger the error may be. The time to exit low power mode may also be longer. On the other hand, a large number will save more power, particularly if equipment parts which are to be shut down during low power mode have a long shutdown and/or wakeup time. The impact on the speed of estimation of crosstalk coefficients between the lines operating in normal mode will also be lower for a large number.

If the number is reduced down to 2 and still faster updating of low power mode lines crosstalk coefficients is needed, the next step may be to switch to the first variant described above, in which the update speed is the same for all lines.

If several lines are in low power mode, they should preferably be synchronized so that they transmit their superframes with synch symbols at the same time. In this way crosstalk coefficient estimation is made at the same speed regardless if one or many lines are in low power mode and the estimation will thus not be further slowed down by additional lines entering low power mode.

There will be no problem with non-stationary crosstalk at exit due to the FEXT cancellation The low power exit procedure may do a fast retrain when exiting low power mode, in order to adjust synchronization and bits and gains. This has the advantage that the requirement of accuracy and/or speed in estimation of crosstalk coefficients for a line in low power mode may be somewhat relaxed.

The concept of fast retrain has been discussed in ITU-T study group 15/Q4 for some years, with various contributions for how to do a fast retrain.

In case of limited resources to do vectoring on all lines in a vectoring group, a low power mode could enable that some lines could utilize the freed resources to achieve some temporary boost in bit rate In a first alternative of the second variant, the transmitted superframe on the line in low power mode is a superframe of the same kind as in the first variant (an example of which is shown in FIG. 2), i.e. there is no transmission on some or all of the data slots. This saves power compared to transmitting a normal superframe where all data slots are used for transmission.

Figure 4:
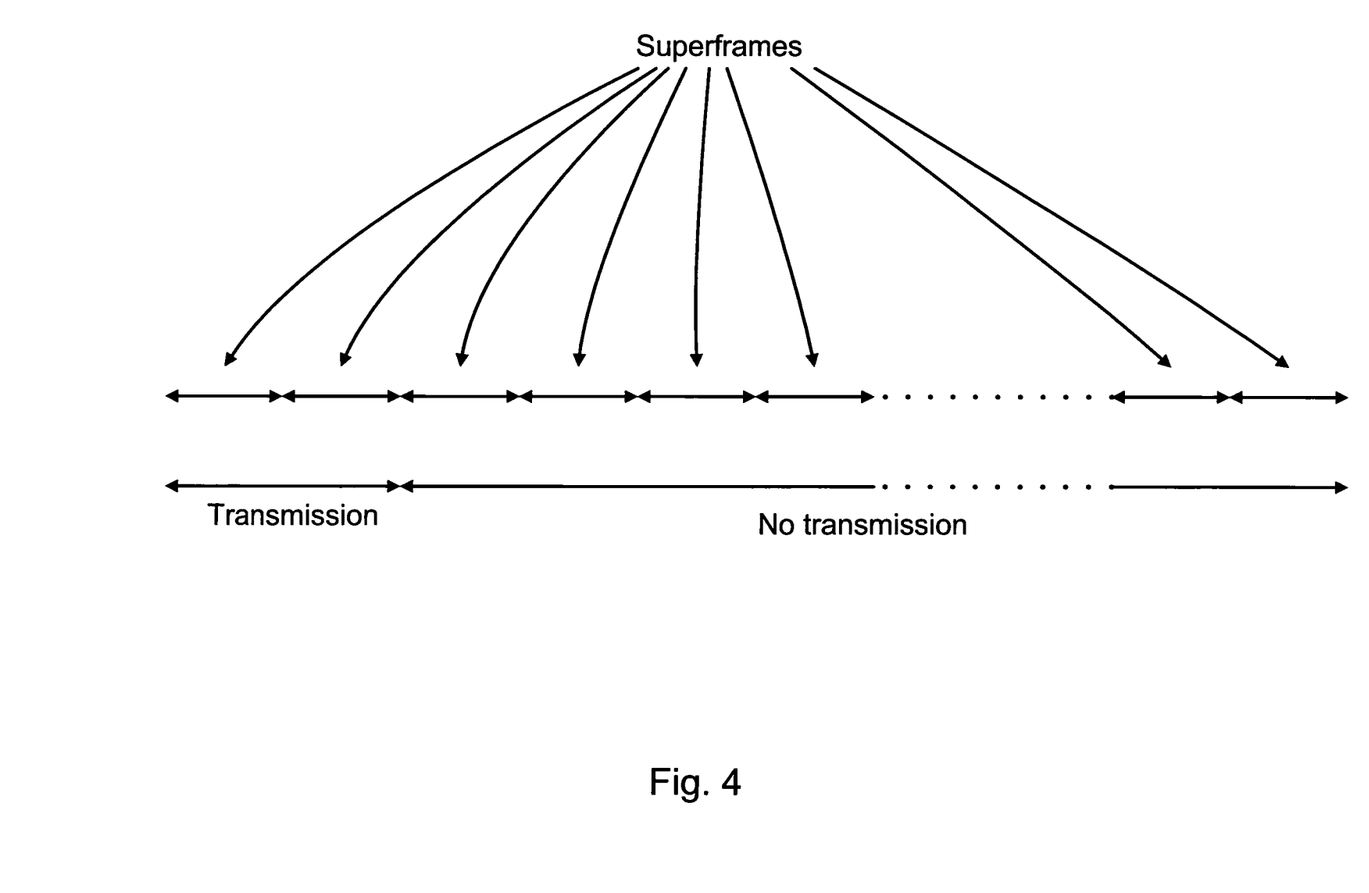
FIG. 4 shows diagram of the time structure of transmission of superframes on a line which is in a low power mode.
Figure 5:
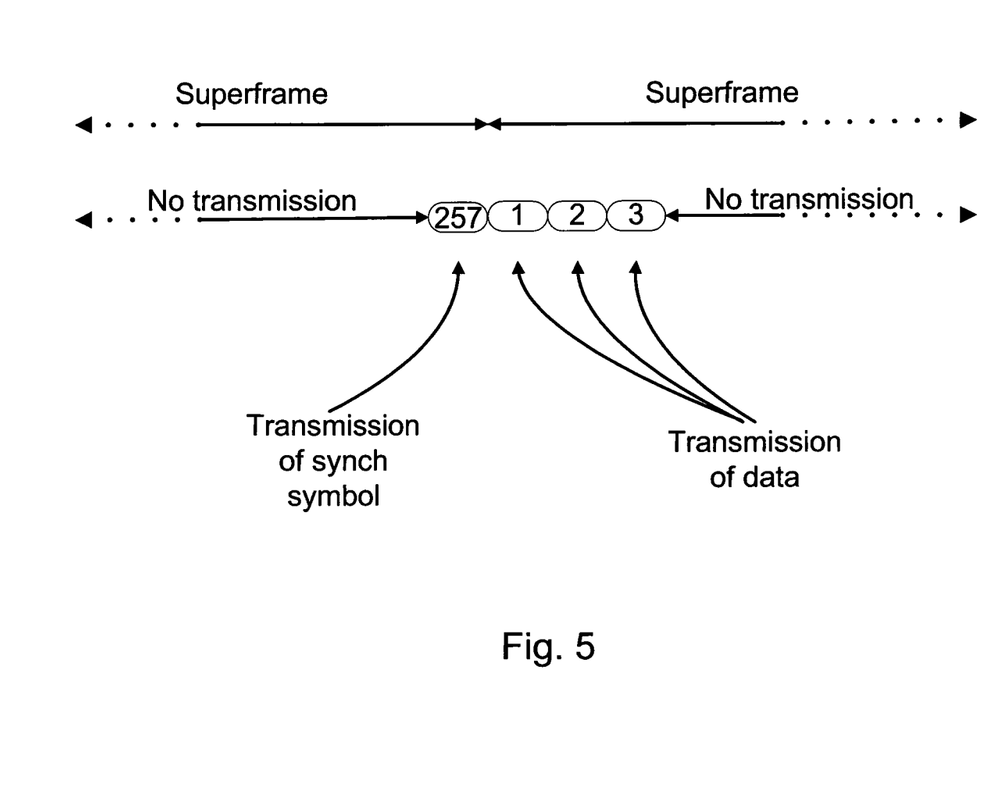
FIG. 5 shows a diagram of the time structure of particular superframes used for a low power mode.

In a second alternative of the second variant, the transmitted superframe as shown in FIG. 3 is a superframe with only a synch symbol. After this superframe, another superframe is transmitted which contains some data at the beginning but no synch symbol. Thus, the data symbols follow immediately after the synch symbol of the previous superframe. This is shown in FIGS. 4 and 5.

Thus, two consecutive superframes are transmitted, but since the first consists only of a synch symbol and the second only of some data, the sending of elements of pilot sequences still can proceed as described above. This has the advantage that parts of the transmission equipment which are turned off during non-transmission periods may be turned on for a single consecutive period (transmitting the synch symbol of the first superframe and the data slots of the second superframe) which also is quite brief.

In a third alternative of the second variant, consecutive superframes are transmitted as in the second alternative, but they are normal superframes. This simplifies implementations. The synch slots of one, or preferably both frames may be used for sending pilot sequences to lines in normal mode and lines in low power mode.

In a third variant, a line in low power mode may follow the second variant, but change to the first variant upon command from the DSLAM when a new line is joining the vectoring group (or otherwise when fast updating of crosstalk coefficients is desired), and then go back to the second variant when the crosstalk coefficient estimation part of the joining process is complete. This has the advantage that full speed crosstalk coefficient estimation is available when needed, but substantial power savings are still made.

In a fourth variant, a line may cease all transmission for a certain time (preferably for a multiple of the time for sending a pilot sequence to the lines in normal mode, then transmit normally for a time sufficient to send one or a few pilot sequences so that crosstalk coefficients may be estimated, then again cease transmission and so on. When several lines are in low power mode, the process is preferably coordinated (e.g. by command from the DSLAM) so that all the lines in low power mode transmit at a same time so that all crosstalk coefficients can be estimated. During the time when the lines in low power mode do not transmit, estimation of crosstalk coefficients between the lines in normal mode continues in the normal way. This variant is particularly simple to implement while still saving a lot of power.

A low power mode would apply to both the DSLAM and the CPE, (or optionally either one of them). However, the choice of pilot sequences will be under the control of the DSLAM. There may be a need for either the DSLAM or the CPE to signal to the other to enter or exit low power mode, or to change the type of low power mode. The decision to enter a low power mode may be preceded by a phase wherein the DSLAM and CPE negotiate which kind of low power mode to use.

The signaling of a mode change command and/or negotiation can be made e.g. through the EOC or the backchannel. Another variant is to signal a command to change mode by means of a modified synch symbol, for example by setting particular tones to 1 and others to −1. The modified synch symbol may also be used to signal to the other end to enable communication through some other channel, e.g. EOC or backchannel, so that commands may then be exchanged through those channels.

Another way of signaling a mode change or request to open a communication channel may be to send a synch symbol in a slot where it is not expected during low power mode. The DSLAM would of course need to adapt the crosstalk coefficient estimation accordingly, so that crosstalk from the sent symbol does not cause errors in the estimation. For example, if such a symbol is received the DSLAM could skip the error samples from that time slot and in the next appropriate synch time slot repeat the previous element of the pilot sequences being sent.

Using the EOC and/or backchannel is simple to implement and provides for elaborate messages to be sent. Using a modified symbol, on the other hand, is robust and works also when transmission of data symbols has been shut down.

In order to make it possible to disable the DSP for longer periods, a memory may be provided, e.g. in the AFE to store in modulated form the synch symbols according to the pilot sequence to be sent, so that the proper element of the pilot sequence can be sent without invoking the DSP. Similarly, a memory may be provided for storing received synch signals in modulated form.

In this way, the DSP may be shut down for longer periods.

The invention is not limited to the standardized DSL variants, such as VDSL2, but is applicable to other vectoring systems as well.

Figure 7:
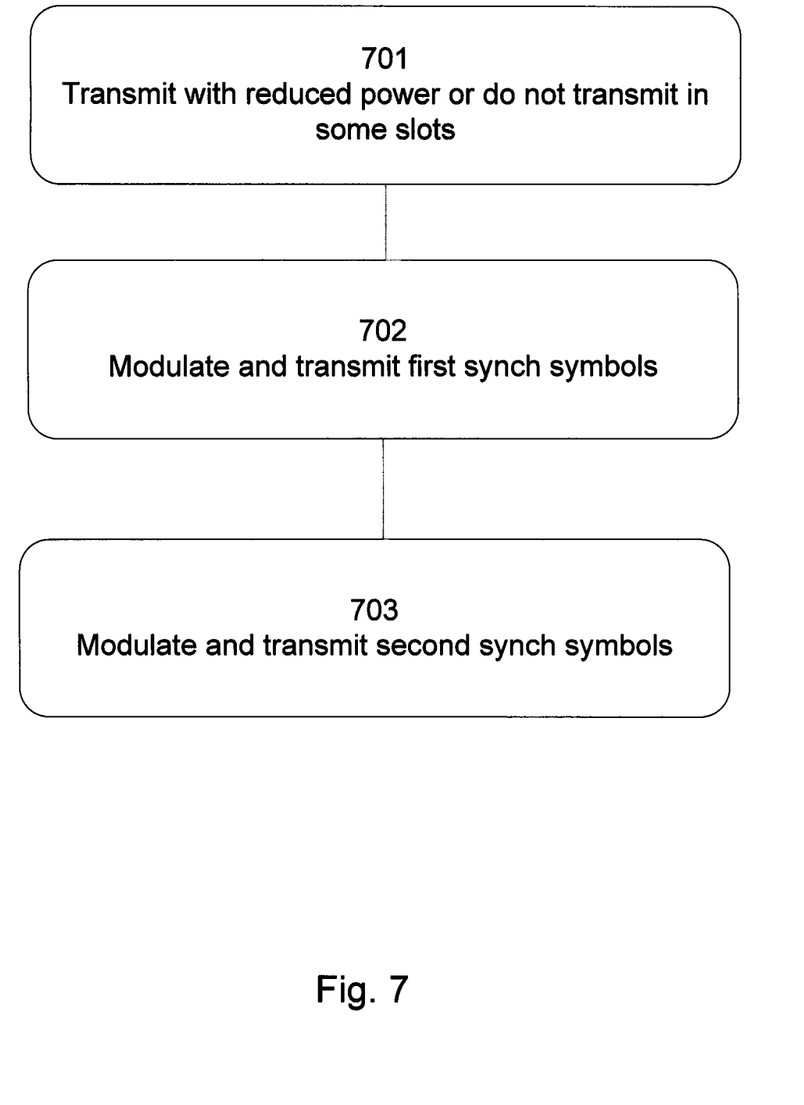
FIG. 7 shows a flow diagram of a method for a low power mode.

FIG. 7 describes a low power mode method.

In a step 701, transmission with reduced power, or no transmission is made in some or all data slots.

In a step 702, modulated first synch symbols are sent to a first line in low power mode In a step 703, modulated second synch symbols are sent to other lines which are not in low power mode.

Note that each step typically consists of many smaller steps of transmitting in individual time slots, and that these smaller steps may be interleaved or simultaneous so that the steps 701, 702 and 703 may typically be executed concurrently.

Figure 6:
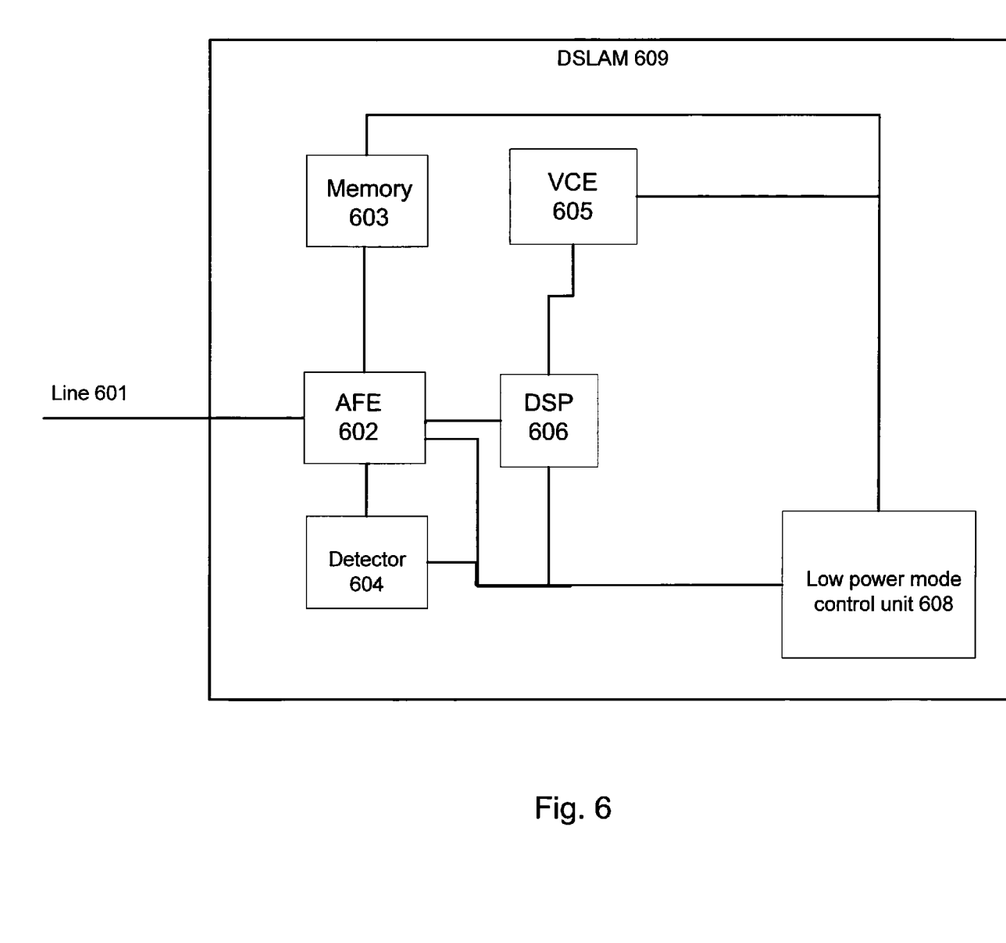
FIG. 6 shows a simplified block schematic of a DSLAM.

FIG. 6 describes a DSLAM. Analog front end 602 provides for D/A (Digital to analog) and A/D (Analog to Digital) conversion and transmission and reception from the line 601. The DSP 606 provides digital signal processing of signals to be transmitted and signals which have been received. The vectoring control entity 605 provides precoding of signals to be transmitted and post-cancellation of signals which have been received, so as to cancel the effect of crosstalk. The low power mode control unit 608 controls the transition between normal mode and low power mode as well as between different low power modes, if there are several. The unit also controls during which time slots transmission is to take place or not. When in low power mode, a pilot sequence to be sent may be stored in modulated form in the memory 603, so that the DSP need not be activated when sending synch symbols. The detector 604 may be used to detect the reception of a modified synch symbol which signals that a mode transition is to be made, or that some data transmission/reception is to be activated so that further commands may be transmitted.

A DSLAM normally supports many lines. There will typically be one per line of the AFE 602, memory 603 and detector 604, while the VCE 605 and Low Power Mode Control Unit 608 are shared among several lines. The DSP 606 may or may not be shared between several lines.

Such a DSLAM may be built from a prior art DSLAM with appropriate modifications and adding the low power mode control unit 608, the memory 603 and the detector 604. The low power mode control unit and the detectors may be implemented by new processors, or by additional programming of processors already used for prior art tasks.

The DSLAM also has connections to a data network (e.g. the internet) (not shown).

Figure 8:
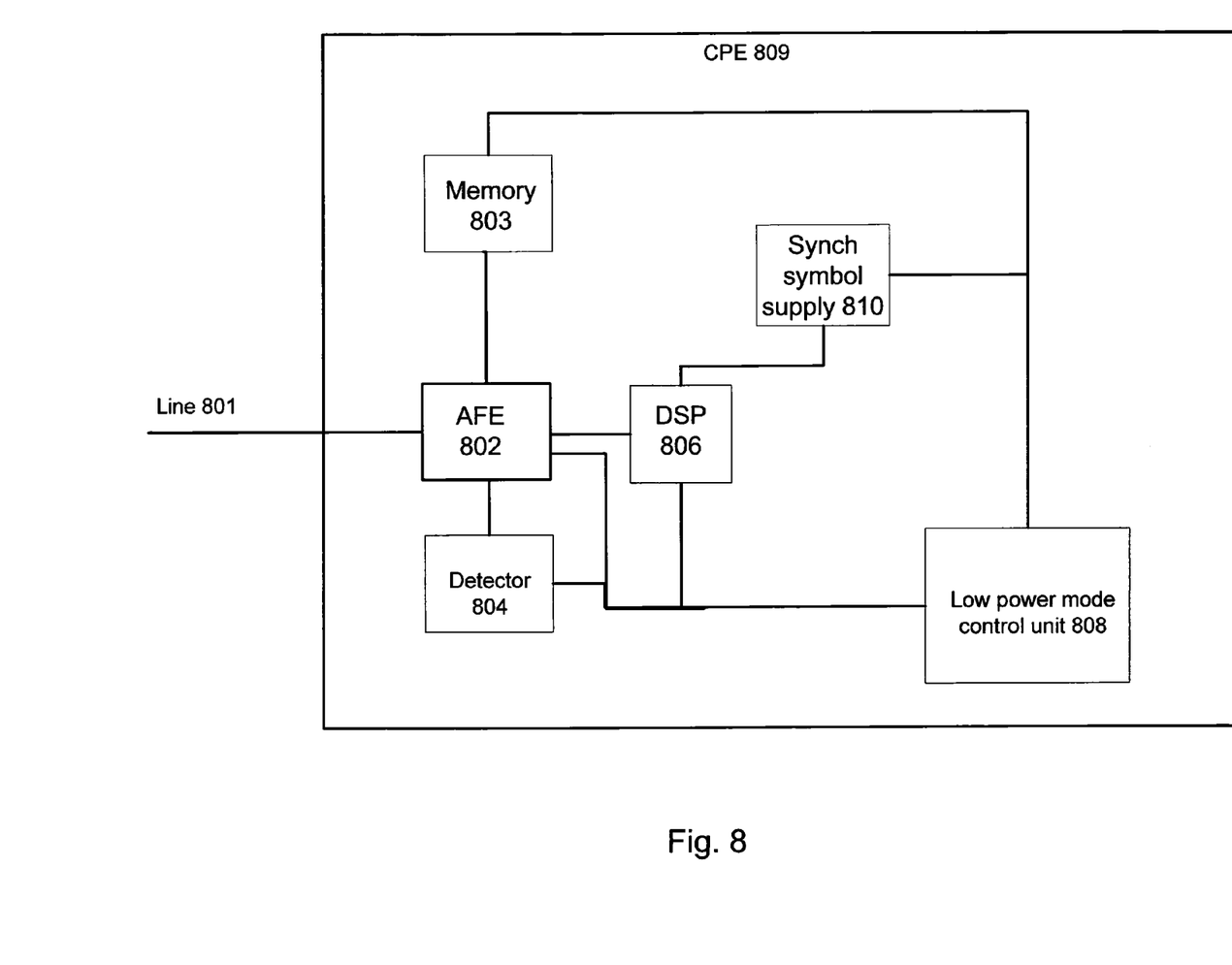
FIG. 8 shows a simplified block schematic of a CPE.

FIG. 8 describes a CPE. Analog front end 802 provides for D/A and A/D conversion and transmission and reception from the line 801. The DSP 806 provides digital signal processing of signals to be transmitted and signals which have been received.

The synch symbol supply 810 provides the synch symbols of a pilot sequence to be transmitted. The sequence may be sent from a DSLAM to the supply 810.

The low power mode control unit 808 controls the transition between normal mode and low power mode as well as between different low power modes, if there are several. The unit also controls during which time slots transmission is to take place or not. When in low power mode, a pilot sequence to be sent may be stored in modulated form in the memory 803, so that the DSP need not be activated when sending synch symbols.

The detector 804 may be used to detect the reception of a modified synch symbol which signals that a mode transition is to be made, or that some data transmission/reception is to be activated so that further commands may be transmitted.

Such a CPE may be built from a prior art CPE with appropriate modifications and adding the low power mode control unit 808, the memory 803 and the detector 804. The low power mode control unit and the detectors may be implemented by new processors, or by additional programming of processors already used for prior art tasks.

The CPE also has connections to a user's equipment, e.g. a computer (not shown).

As explained above, options for the invention include

Transmitting synch symbols to a line in low power mode in all the time slots which in the normal mode are allocated to synch symbols.

Not transmitting during some whole superframes, while in other superframes either transmitting normally or not transmitting in some of the time slots which in the normal mode are allocated for transmission of payload data.

Using a modified synch symbol to signal to an equipment to change from a low power mode to another mode.

A DSLAM or CPE comprising a detector for detecting a modified synch symbol and for causing the DSLAM or CPE to change from a low power mode to another mode upon detecting a modified synch symbol Storing a pilot sequence formed by synch symbols in modulated form in a memory so as to enable sending of the pilot sequence without activating the DSP.

Storing a pilot sequence formed by received synch symbols in modulated form in a memory, so as to enable later processing when the DSP is activated.

A DSLAM or CPE comprising a pilot sequence storage unit for storing signals in modulated form to be sent by the AFE so that the sequence may be sent without activating a DSP.

A DSLAM or CPE comprising a pilot sequence storage unit for storing signals in modulated form which have been received by the AFE so that the sequence may be demodulated later when a DSP is activated.

The invention claimed is:

1. A method for saving power in a digital subscriber line (DSL) access equipment, the DSL access equipment having a normal mode for data transmission and a low power mode for saving power, the DSL access equipment configured to perform vectoring crosstalk cancellation between lines in a group of lines of the DSL access equipment, the method comprising:
in the DSL access equipment having the normal mode for data transmission and the low power mode for saving power, on a first line of the group of lines that is configured in the low power mode, determining to not transmit or to transmit, with reduced power relative to a line being configured in the normal mode, in some or all of the time slots which in the normal mode are allocated for transmission of payload data; and
wherein determining to transmit with reduced power includes:
transmitting first synch symbols on the first line in some but not all of the time slots which in the normal mode are allocated for transmitting synch symbols, wherein the first synch symbols are modulated so as to form a pilot sequence;
transmitting second synch symbols on the other lines of the group of lines and in the same time slots as the first synch symbols are transmitted, wherein the second synch symbols are modulated so as to form a pilot sequence for each of the other lines, wherein each of the pilot sequences associated with the first synch symbols and the second synch symbols is orthogonal to each other and all of the pilot sequences associated with the first synch symbols and the second synch symbols represent a first set of pilot sequences; and
transmitting on the other lines of the group of lines in time slots that in the normal mode are allocated for transmitting synch symbols and that the first and second synch symbols are not transmitted, a second set of pilot sequences, wherein each of the second set of pilot sequences is orthogonal to each other.

2. The method of claim 1, wherein determining to not transmit includes determining to not transmit during some whole superframes, a superframe being time slots from an end of a time slot allocated for transmission of a synch symbol in the normal mode to the end of a next time slot so allocated.

3. The method of claim 2:
wherein, during other superframes, synch symbols are transmitted; and
wherein, in some time slots of those superframes, which in the normal mode are allocated for transmission of payload data, determining to not transmit.

4. The method of claim 1, wherein a modified synch symbol is used to signal a change from a low power mode to another mode for the DSL access equipment.

5. The method of claim 1, wherein the pilot sequence formed by the first synch symbols is stored in modulated form in a memory, so as to enable sending of the pilot sequence without activating a Digital Signal Processor (DSP) of the DSL access equipment.

6. The method according to claim 1, wherein error samples recorded as a result of the transmission of the second set of pilot sequences are used to estimate crosstalk coefficients between the lines in normal mode.

7. The method according to claim 1, wherein error samples recorded as a result of the transmission of the first set of pilot sequences are used to estimate crosstalk coefficients between all the lines in either normal or low power mode.

8. The method of claim 1, wherein the first set of pilot sequences is used to perform the vectoring crosstalk cancellation between any of the group of lines and the second set of pilot sequences is used to perform the vectoring crosstalk cancellation between lines of the group of lines that are configured in the normal mode.

9. The method of claim 1, wherein the low power mode is associated with transmitting in only a selected time slot.

10. The method of claim 1, wherein determining to transmit with reduced power further includes transmitting the second set of pilot sequences on the first line of the group of lines in time slots that the first synch symbols are not transmitted and that in the normal mode are allocated for transmitting synch symbols.

11. The method of claim 1, wherein determining to transmit with reduced power further includes determining to not transmit on the first line of the group of lines in time slots other than those that the first synch symbols are transmitted.

12. A digital subscriber line (DSL) Access Multiplexer (DSLAM) comprising:
in the DSLAM having a normal mode for data transmission and a low power mode for saving power, the DSLAM having a group of lines with at least one line configured in the low power mode and a portion of the group of lines configured in the normal mode, one or more processing circuits configured to function as:
- a low power mode control circuit configured to shut down transmission during selected superframes or during certain time slots within a superframe;
- a vectoring control circuit configured to transmit orthogonal pilot sequences in synch selected time slots during which transmission is not shut down by the low power mode control circuit;
- a transmitter configured to:
  - transmit, on all lines in the group of lines, a first set of pilot sequences in the synch selected time slots that are not shut down for transmission; and
  - transmit, on the portion of the group of lines that are in the normal mode, a second set of pilot sequences in synch time slots where the first set of pilot sequences is not transmitted.

13. The DSLAM of claim 12, wherein the one or more processing circuits are further configured to function as a detector circuit configured to:
- detect a modified synch symbol; and
- cause the DSLAM to change from a low power mode to another mode upon detecting such a modified synch symbol.

14. The DSLAM of claim 12:
- wherein the DSLAM further comprises an Analog Front End (AFE) and a Digital Signal Processor (DSP); and
- wherein the one or more processing circuits are further configured to function as a pilot sequence storage configured to store signals in modulated form to be sent by the AFE, so that the sequence is sent without activating the DSP.

15. The DSLAM of claim 12, wherein the first set of pilot sequences is used to perform vectoring crosstalk cancellation between any of the group of lines and the second set of pilot sequences is used to perform the vectoring crosstalk cancellation between lines of the group of lines that are configured in the normal mode.

16. A method for saving power of a digital subscriber line (DSL) access equipment, the DSL access equipment having a normal mode for data transmission and a low power mode for saving power, the DSL access equipment having a plurality of lines with at least one line configured in the low power mode and remaining lines configured in the normal mode, the DSL access equipment configured to perform vectoring crosstalk cancellation between lines of the DSL access equipment, the method comprising:
- in the DSL access equipment having the normal mode for data transmission and the low power mode for saving power, the DSL access equipment having the plurality of lines with at least one line configured in the low power mode and the remaining lines configured in the normal mode, transmitting, on the plurality of lines and in one or more selected synch time slots associated with the low power mode, a first set of pilot sequences, wherein each of the first set of pilot sequences is orthogonal to each other;
- transmitting, on the remaining lines configured in the normal mode and in synch time slots other than the one or more selected synch time slots, a second set of pilot sequences, wherein each of the second set of pilot sequences is orthogonal to each other;
- wherein the first set of pilot sequences enables vectoring crosstalk cancellation between any of the plurality of lines and the second set of pilot sequences enables vectoring crosstalk cancellation between the remaining lines configured in the normal mode; and
- wherein error samples recorded as a result of the transmission of the first set of pilot sequences are used to estimate crosstalk coefficients between the lines in either normal or low power mode.

* * * * *